United States Patent
Puett

(12) 
(10) Patent No.: US 6,569,938 B1
(45) Date of Patent: May 27, 2003

(54) PROTECTIVE COATING FOR PAINTED SURFACES

(76) Inventor: Shawn J. Puett, 4040 Earney Rd., Woodstock, GA (US) 30188-2247

(*) Notice: Subject to any disclaimer, the term of this patent is extended or adjusted under 35 U.S.C. 154(b) by 0 days.

(21) Appl. No.: 09/520,527

(22) Filed: Mar. 8, 2000

(51) Int. Cl.$^7$ .............................................. C08L 33/00
(52) U.S. Cl. ...................... 524/556; 524/555; 524/599; 524/606; 524/543
(58) Field of Search .......................... 424/47; 525/191; 526/303.1, 319, 317.1

(56) References Cited

U.S. PATENT DOCUMENTS

| | | | | |
|---|---|---|---|---|
| 4,507,385 A | * | 3/1985 | Steklenski et al. | 430/523 |
| 4,548,967 A | | 10/1985 | Brown et al. | 524/56 |
| 4,777,199 A | * | 10/1988 | Ishii et al. | 524/284 |
| 5,612,404 A | * | 3/1997 | Das et al. | 524/507 |
| 5,879,669 A | * | 3/1999 | Clausen et al. | 424/70.11 |

OTHER PUBLICATIONS

Material Safety Data Sheet, Luviset CAN, BASF Corporation, Mar. 1999.*
Technical Bulletin, Luviset CAN, BASF Aktiengesellschaft, May 2000.*
Technical Bulletin, Ultrahold 8, BASF Aktiengesellschaft, Sep. 2000.*
Technical Bulletin, Ultrahold Strong, BASF Aktiengesellschaft, Sep. 2000.*
Technical Bulletin, Luviset P.U.R., BASF Aktiengesellschaft, Jan. 2000.*
Technical Bulletin, Resyn 28–2930, National Starch & Chemical.*
BASF; Material Safety Data Sheet for LUVISET (R) CAN polymer; Mar. 1999.
Technical Bulletin; Mazamide 80 CG; Jun. 1998.
BASF; Material Safety Data Sheet for ULTRAHOLD STRONG; Mar. 1999.
WACO Chemical & Supply; Material Safety Data Sheet; WACOMAXICOAT RGS–II; Jan. 1998.

* cited by examiner

*Primary Examiner*—David W. Wu
*Assistant Examiner*—Rip A Lee
(74) *Attorney, Agent, or Firm*—Hovey William LLP

(57) ABSTRACT

A composition for protecting a target surface and a method of applying the composition is provided. The composition includes a PVP compound (i.e., polyvinylpyrrolidone and moieties thereof) or an anionic polymer dispersed in a solvent such as water or a $C_1$–$C_4$ alcohol. The compositions can further include optional ingredients such as surfactants, fragrances, waterproofing agents, and coloring agents. The compositions are applied to the target surface in a thin layer and allowed to dry. Preferably, at least one additional coat is subsequently applied to the first layer. The dried coating layers are essentially invisible to observers and have an ASTM D2240-97 hardness of at least about 70, making them useful for protecting the target surface from potentially damaging foreign elements (e.g., such as protecting the front end of an automobile from paint chips caused by flying rocks). The layers remain substantially in place upon exposure to rain. Additional layers can be applied periodically as desired.

11 Claims, No Drawings

PROTECTIVE COATING FOR PAINTED SURFACES

BACKGROUND OF THE INVENTION

1. Field of the Invention

The instant invention is directed towards protective coatings for use on automobile surfaces and other surfaces in need of protection from foreign objects or elements. The coatings include a PVP compound or an anionic polymer dissolved in a solvent such as ethanol.

2. Description of the Prior Art

Automobiles are regularly exposed to foreign objects and elements which can be harmful to their exterior finishes. For example, in geographical regions which are subject to wintery conditions, road salt and sand are often spread on the roads in order to combat the slippery conditions. However, salt and sand can be abrasive to an automobile's painted surface. Furthermore, the salt can promote rusting of the automobile's metal body. Thus, people who reside in these regions must wash their cars or trucks frequently in order to attempt to lessen these problems. This can be burdensome, particularly at colder temperatures, making it very difficult for people to wash their cars or trucks unless they are willing to wait in long lines at enclosed carwashes.

Cars and trucks are also regularly subjected to flying rocks which can strike the vehicle and chip its paint. This is particularly problematic on gravel roads or near road construction areas where small rocks and debris are often "kicked up" by other vehicles (and particularly by large trucks) and caused to hit the car or truck traveling behind those vehicles. The only reasonable protection against this problem in the past has been the use of a so-called automobile "bra" fastened to the front end of the automobile. These bras consist of a large section of a durable fabric (usually black in color) having openings therein which correspond to the location of the car headlamps and grille. While these bras do assist in protecting the car from the flying rocks, they are highly visible and, therefore, undesirable to many car owners. Furthermore, automobile bras are difficult if not impossible to find in appropriate sizes and configurations for use with many vans, pickup trucks, and other large vehicles.

Another problem often encountered by automobile owners is that of insects which are struck by automobiles during travel. Insects are quite numerous during warm weather evenings, particularly in rural areas. When the insects strike the car or truck, they usually "splatter," leaving behind a liquid residue on the car or truck surface which is very difficult to remove without prompt and vigorous scrubbing of the affected area, possibly requiring the use of a chemical insect remover. Even with this careful attention, some insects comprise fluids that may actually stain the paint. The solid remains of the insect can also become embedded in the car or truck surface, presenting additional cleaning problems.

In an attempt to combat this problem, some car or truck owners purchase bug shields which are installed above the grille of the car or truck. However, these shields do not protect the grille, headlamps, or bumper of the vehicle from insects, and offer only limited protection to the hood and windshield areas. Furthermore, bug shields are undesirable to many car or truck owners who do not consider them to be visually appealing.

There is a need for a method for protecting automobile surfaces from sand, road salt, insects, rocks, and other elements. The method must be essentially unnoticeable by observers, easy to use, and harmless to the automobile.

SUMMARY OF THE INVENTION

The instant invention overcomes these problems by providing a protective coating composition which lessens or prevents the problems caused by foreign elements and objects which tend to undesirably adhere to a target surface or which can damage that surface.

In one embodiment the inventive compositions are initially flowable and comprise a high molecular weight polyvinylpyrrolidone (PVP) compound dispersed in a solvent selected from the group consisting of water, alcohols, and mixtures thereof. The compositions include from about 3.5–60% by weight, preferably from about 5–15% by weight, and more preferably from about 6–10% by weight of the PVP compound, based upon the total weight of all ingredients used to form the composition taken as 100% by weight. The PVP compound should have a molecular weight of at least about 160,000 g/mol, preferably at least about 360,000 g/mol, and more preferably from about 1,100,000–2,000,000 g/mol.

As used herein, "polyvinylpyrrolidone (PVP) compound" is intended to refer to polyvinylpyrrolidone as well as functional moieties thereof. For example, the term "PVP compound" would also include:

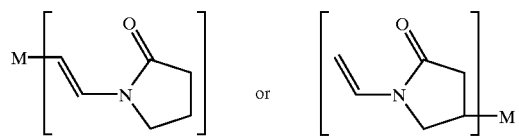

where "M" is a molecule bonded to the PVP structure. Thus, "polyvinylpyrrolidone (PVP) compound" would include those moieties where any one or more of the constituents of polyvinylpyrrolidone are bonded to another molecule. The most preferred PVP compound for use in the instant is simply polyvinylpyrrolidone as represented by the structure $[C_6H_9NO]_n$.

The solvent is present in the composition of this embodiment at a level of from about 40–97.5% by weight, preferably from about 60–95% by weight, and more preferably from about 85–93% by weight, based upon the total weight of all ingredients used to form the composition taken as 100% by weight. Preferred solvents include $C_1$–$C_4$ branched and unbranched alcohols, with ethanol and isopropanol being particularly preferred alcohols. In aqueous compositions according to the invention, the composition pH is from about 5–10.5, preferably from about 7.0–8.5, and more preferably about 7.5.

The inventive compositions should also be essentially sugar-free in order to substantially prevent rain from removing the dried compositions from the surfaces they are to protect. As used herein, "essentially sugar-free" means that the compositions contain less than about 0.05% by weight sugar, preferably less than about 0.02% by weight sugar, and more preferably about 0% by weight sugar, based upon the total weight of all ingredients used to form the composition taken as 100% by weight.

There are several optional ingredients that can be advantageously added to the inventive PVP-containing protective compositions. One particularly useful compound is a waterproofing agent. As used herein, "waterproofing agent" refers to a compound which can be mixed with the other ingredients of the composition and which assists in inhibiting the dried composition from absorbing water. When utilized, the waterproofing agent should be included in the composition at a level of less than about 4% by weight, and preferably from about 0.2–1% by weight, with ammonium stearate and calcium stearate being particularly preferred waterproofing agents. The calcium stearate is also a flatting agent and is very useful for improving the smoothness of the composition on the target surface.

In an alternate embodiment, the inventive compositions are initially flowable and comprise (and preferably consist essentially of) an anionic polymer dispersed in a solvent. While any anionic polymer is suitable, it is preferred that the anionic polymer comprise a polyurethane (such as a polyurethane comprised of polyesterdiols, neopentyl-glycol, isophorone diisocyanate, and dimethylolpropanoic) or a polymer blend which includes at least one vinyl compound and a carboxylic acid. Preferred vinyl compounds include butyl acrylamides and vinyl esters such as vinyl acetate, ethyl acrylate, and vinyl neodecanoate. Preferably, the blend comprises two such vinyl compounds (e.g., ethyl acrylate and a butyl acrylamide or vinyl acetate and vinyl neodecanoate).

The carboxylic acid preferably comprises a $C_3$–$C_{14}$, and more preferably $C_3$–$C_6$, branched or unbranched hydrocarbon group. Preferred carboxylic acid include those selected from the group consisting of crotonic acid, acrylic acid, and dimethylolpropanoic acid.

A particularly preferred anionic polymer blend includes from about 1–10% by weight vinyl acetate, from about 40–80% by weight carboxylic acid, and from about 30–50% by weight vinyl neodecanoate, based upon the total weight of the polymer blend taken as 100% by weight. The anionic polymer blend is formed by simply forming a mixture of the various ingredients described above. A preferred anionic polymer blend is available from BASF Aktiengesellschaft in Germany under the name Luviset CAN®.

Preferred solvents for dispersing the anionic polymer include $C_1$–$C_4$ branched and unbranched alcohols such as methanol, ethanol, propanol, isopropanol, and butanol. The protective compositions of this embodiment should include from about 3–40% by weight polymer blend, preferably from about 10–25% by weight polymer blend, and more preferably from about 15–20% by weight polymer blend, based upon the total weight of the protective composition taken as 100% by weight. The solvent should be mixed with the polymer blend at a level of from about 60–97% by weight, preferably from about 75–90% by weight, and more preferably from about 80–85% by weight, based upon the total weight of the protective composition taken as 100% by weight.

Other optional ingredients which can be incorporated into the inventive compositions (regardless of the embodiment) include flow agents, drying agents, defoaming agents, fish-eye preventatives (e.g., silicone fluids), fragrances, and coloring agents. A surfactant can be included in the PVP-containing embodiment when water is the major solvent present in the composition. When used, the surfactant should be present at a level of less than about 3% by weight, and preferably less than about 1% by weight, based upon the total weight of all ingredients used to form the composition taken as 100% by weight. Suitable surfactants include benzalkonium chloride, benzethonium chloride, sodium lauryl sulfate, and a surfactant sold under the trade name TERGITOL™ (available from Union Carbide).

The inventive compositions are formed by simply mixing the ingredients (either the PVP compound or the polymer blend), solvent(s), and other optional ingredients for about 5–10 minutes until a uniform dispersion is obtained. In order to effect uniform mixing, the ingredients can be heated to a temperature of from about 105–115° F., if desired. Heating to this temperature is preferred if calcium stearate is one of the ingredients.

In an alternate embodiment, the composition can be formulated into an aerosol utilizing known propellants (e.g., propane or butane). In aerosol embodiments, the PVP compound comprises from about 2–15% by weight, and preferably from about 5–10% by weight of the total aerosol product, while the solvent comprises from about 37–75% by weight, and preferably from about 45–48% by weight of the total aerosol product. The remainder of the product will generally be propellant. Of course, those skilled in the art will appreciate that the concentrations of the ingredients in the aerosol products can be altered to accommodate the use of the optional ingredients as described above.

In application, a quantity of the inventive composition is simply applied (e.g., by spraying, by brushing, etc.) to the target surface. Preferably, the composition is applied in a thin coat of from about 1–3 mm in thickness. This coat should be allowed to dry (about 10 minutes) prior to normal use of the surface. However, while one layer may be sufficient in some applications, it is generally preferred to apply two to three layers of the composition, allowing each layer to dry prior to the addition of a subsequent layer. As a result of this multiple coating process, the combined thickness of all coats of the composition on the surface should be from about 3–6 mm about 10 minutes after application of the final layer.

The instant composition has a significant advantage over the prior art in that it can be applied under ambient conditions (including high humidity environments such as 60% HR or higher, and/or cold temperatures such as 20° F. or lower). Furthermore, upon drying, the inventive compositions form a protective coating that is harder than prior art coatings. That is, the hardnes of the dried coating is at least about 70, and preferably at least about 80, as determined by ASTM D2240–97 (durometer A).

The inventive compositions are safe and effective for protecting many different surfaces. For example, the compositions can be applied to vulnerable portions of an automobile's exterior (e.g., to the grills, chrome, headlamps, hood, and/or front end of the automobile) in order to protect those surfaces from contact with undesirable elements such as acid rain, sand, road salt, insects (which can become embedded in the paint), and rocks (which may chip the paint). Additionally, the compositions can be applied to windows (e.g., house windows, automobile windows, etc.) to protect them from overspray during a painting process. Finally, while the dried coatings provide significant protection against insects and rocks which may come into contact with the protected surface, the PVP coating can be readily removed with high pressure water, or with detergent in water in those situations where a waterproofing agent is utilized. The anionic polymer coating can be removed by applying a remover solution (see Table 1) to the coating followed by rinsing the surface with water or wiping it clean.

TABLE 1

| | Remover Solution | | | |
|---|---|---|---|---|
| Ingredient | Broad Range[a] | More Preferred Range[a] | Most Preferred Range[a] | Specific Examples |
| surfactant | 1–35% | 5–25% | 8–15% | lauramine oxide, N,N-Bis (2-hydroxy-ethyl) cocoamide |
| neutralizer or neutralizing agent[b] | 1–25% | 3–10% | 5–7% | amine compounds such as triisopropanolamine, diethyleneaminopropyl-amine, 2-amino-2-methyl-1-propanol, di-ethanolamine, propyl-amine |
| solvent | 2–97% | 15–80% | 30–70% | aqueous solvents such as ethanol (25%) in water |

[a]based upon the total weight of the remover solution taken as 100% by weight.
[b]neutralizes the acid groups of the protective composition.

DETAILED DESCRIPTION OF THE PREFERRED EMBODIMENTS

EXAMPLES

The following examples set forth preferred methods in accordance with the invention. It is to be understood, however, that these examples are provided by way of illustration and nothing therein should be taken as a limitation upon the overall scope of the invention.

Example 1

In this set of test runs, polyvinylpyrrolidone (PVP) (either PVP K-90 having a molecular weight of 360,000 g/mol, and obtained from Reagents, Inc., Charlotte, N.C. or PVP 630 having a molecular weight of 630,000 g/mol and obtained from Alfa Aesar, Ward Hill, Mass.) was mixed with water, acetone, and TERGITOL™ (a surfactant available from Union Carbide). Mixing was carried out until a substantially homogeneous mixture was obtained (about 5–10 minutes). Table 2 sets forth the quantities of the respective ingredients utilized in these test runs.

TABLE 2

| Compound | Run #1 weight | Run #1 % by weight[a] | Run #2 weight | Run #2 % by weight[a] | Run #3 weight | Run #3 % by weight[a] |
|---|---|---|---|---|---|---|
| PVPK-90 (MW=360,000) | 20 g | 8% | 20 g | 6% | 0 | 0 |
| PVP630 (MW=630,000) | 0 | 0 | 0 | 0 | 20 g | 7% |
| Water | 200 g | 82% | 300 g | 82% | 50 g | 19% |
| Acetone | 20 g | 8% | 40 g | 11% | 200 g | 74% |
| TERGITOL ™ | 5 g | 2% | 5 g | 1% | 0 | 0 |

[a]Percent by weight based upon the total weight of all ingredients in the formulation taken as 100% by weight.

Upon examining the formulations of runs 1–3, it was determined that acetone was not an acceptable solvent as it tended to cause the composition to congeal.

Example 2

The process of Example 1 was repeated with an alcohol as the solvent in lieu of acetone or water. Table 3 sets forth these formulations.

TABLE 3

| Compound | Run #4 weight | Run #4 % by weight[a] | Run #5 weight | Run #5 % by weight[a] | Run #6 weight | Run #6 % by weigh[a] | Run #7 weight | Run #7 % by weight[a] |
|---|---|---|---|---|---|---|---|---|
| PVP K-90 (MW = 360,000) | 0 | 0 | 0 | 0 | 5 g | 9% | 40 g | 9% |
| PVP 630 (MW = 630,000) | 20 g | 9% | 10 g | 9% | 0 | 0 | 0 | 0 |
| Ethanol | 0 | 0 | 100 g | 91% | 50 g | 91% | 400 g | 91% |
| Isopropanol | 200 g | 91% | 0 | 0 | 0 | 0 | 0 | 0 |

[a]Percent by weight based upon the total weight of all ingredients in the formulation taken as 100% by weight.

From these runs, it was determined that the compositions were substantially improved with the use of an alcohol rather than acetone. Each of the formulations had the desired properties for use as a protective coating.

Example 3

In this example, a protective composition was prepared utilizing a lower molecular weight PVP (i.e., PVP K-15, also available from Reagents, Inc. and having a molecular weight of about 10,000 g/mol) to determine the effect of the PVP molecular weight on the composition. PVP K-15 (25 g, 25% by weight) was mixed with 75 g (75% by weight) of water. The resulting composition was applied to the metal surface of an automobile and allowed to dry. The resulting coating was too soft and fingerprinted easily, indicating that the low molecular weight PVP did not form a sufficiently hard coating.

Example 4

In this example, various formulations of the protective coating compositions were applied to portions of an automobile to determine the respective formulation's suitability for use as a protectant.

Part I

PVP K-90 (25 g, 25% by weight) was mixed with 75 g (75% by weight) of water for about 5–10 minutes. The composition was then applied with a damp sponge to a headlamp cover and allowed to dry for 10–15 minutes. The dried coating was clear and essentially invisible.

Part II

Formulation A was prepared by mixing PVP K-90 (25 g, 25% by weight) with 5 g of TERGITOL™ (5% by weight) and 70 g of water (70% by weight) for about 5–10 minutes. The composition was applied with a damp sponge to a portion of the painted surface of an automobile and allowed to dry for 10–15 minutes. The dried coating was then misted with water. This process was repeated with 25 g (25% by weight) PVP K-90, 1 g (1% by weight) TERGITOL™, 2 g (2% by weight) glycol ether, and 72 g (72% by weight) of water. The coatings were somewhat cloudy in appearance, particularly the coating which utilized 5% by weight TERGITOL™. This indicated that only a very small amount of TERGITOL™ should be utilized in the formulations, and that glycol ether is not preferred for dispersion in PVP.

Part III

A formulation was prepared by mixing 50% by weight of Formulation A from Part II of this Example with 50% by weight of the formulation prepared in Example 3 above. The composition was then applied with a damp sponge to a portion of the painted surface of an automobile and allowed to dry for 10–15 minutes. The dried coating was mostly clear in appearance and not glossy.

I claim:

1. A method of protecting an automobile surface from foreign elements or objects, said method comprising the steps of:

providing a quantity of a flowable protective composition comprising an anionic polymer dispersed in a solvent; and applying said composition to the surface and allowing said composition to dry to form a coating having a hardness of at least about 70, said hardness being determined by ASTM D2240-97 durometer A.

2. The method of claim 1, wherein said anionic polymer is present in said composition at a level of from about 3–40% by weight, based upon the total weight of the composition taken as 100% by weight.

3. The method of claim 2, wherein said anionic polymer is selected from the group consisting of polyurethanes and polymer blends comprising at least one vinyl compound and a carboxylic acid.

4. The method of claim 3, wherein said vinyl compound is selected from the group consisting of butyl acrylamides and vinyl esters.

5. The method of claim 4, wherein said vinyl ester is selected from the group consisting of vinyl acetate and vinyl neodecanoate.

6. The method of claim 3, wherein said polymer blend comprises ethyl acrylate and a butyl acrylamide.

7. The method of claim 3, wherein said polymer blend comprises vinyl acetate and vinyl neodecanoate.

8. The method of claim 3, wherein said carboxylic acid is a $C_3$–$C_{14}$ branched or unbranched carboxylic acid.

9. The method of claim 8, wherein said carboxylic acid is selected from the group consisting of crotonic acid, acrylic acid, and dimethylolpropanoic acid.

10. The method of claim 3, wherein said polymer blend comprises from about 1–10% by weight vinyl acetate, from about 40–80% by weight carboxylic acid, and from about 30–50% by weight vinyl neodecanoate, based upon the total weight of the polymer blend taken as 100% by weight.

11. A method of temporarily protecting a surface, said method comprising the steps of:

providing a quantity of a flowable protective composition comprising an anionic polymer dispersed in a solvent;

applying said composition to the surface and allowing said composition to dry to yield a coating having a hardness of at least about 70, said hardness being determined by ASTM D2240-97 durometer A; and removing said coating from said surface with a remover dispersion comprising a surfactant, a neutralizer, and a solvent.

* * * * *